US011119685B2

(12) United States Patent
Anand et al.

(10) Patent No.: US 11,119,685 B2
(45) Date of Patent: Sep. 14, 2021

(54) SYSTEM AND METHOD FOR ACCELERATED DATA ACCESS

(71) Applicant: EMC IP Holding Company LLC, Hopkinton, MA (US)

(72) Inventors: Nitin Anand, Bangalore (IN); Vipin Kumar Kaushal, Bharthana Etawah (IN); Anand Reddy, Bangalore (IN); Krishnendu Bagchi, Bangalore (IN); Sudha Vamanraj Hebsur, Bangalore (IN); Gajendran Raghunathan, Bangalore (IN); Niketan Narayan Kalaskar, Bangalore (IN); Pallavi Prakash, Bangalore (IN); Matthew Dickey Buchman, Seattle, WA (US); Jaishree Balasubramanian, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

(21) Appl. No.: 16/392,562

(22) Filed: Apr. 23, 2019

(65) Prior Publication Data
US 2020/0341638 A1 Oct. 29, 2020

(51) Int. Cl.
*G06F 3/06* (2006.01)
(52) U.S. Cl.
CPC ............ *G06F 3/065* (2013.01); *G06F 3/0619* (2013.01); *G06F 3/0659* (2013.01); *G06F 3/0664* (2013.01); *G06F 3/0673* (2013.01)

(58) Field of Classification Search
CPC ...... G06F 3/0619; G06F 3/065; G06F 3/0659; G06F 3/0664; G06F 3/0673; G06F 11/1469; G06F 11/1484
See application file for complete search history.

(56) References Cited

U.S. PATENT DOCUMENTS

| 7,395,244 | B1 | 7/2008 | Kingsford |
| 8,479,297 | B1 | 7/2013 | Edukulla et al. |
| 8,510,271 | B1 | 8/2013 | Tsaur et al. |
| 8,554,918 | B1 | 10/2013 | Douglis |
| 8,849,947 | B1 | 9/2014 | Artzi et al. |
| 9,037,547 | B1 | 5/2015 | Shivdeo |

(Continued)

OTHER PUBLICATIONS

Extended European Search Report issued in corresponding European Application No. 20166272.3, dated Sep. 28, 2020.

(Continued)

*Primary Examiner* — Aracelis Ruiz
(74) *Attorney, Agent, or Firm* — Chamberlain, Hrdlicka, White, Williams & Aughtry

(57) ABSTRACT

A backup storage includes a persistent storage and a backup manager. The persistent storage stores backups of entities and a global application data map. The backup manager obtains a restoration request for restoration of an application hosted by an entity of the entities; makes a determination to accelerate the restoration based, at least in part, on the application; in response to the determination: identifies a virtual disk level backup of the entity that is associated with the application using the global application data map; obtains the virtual disk level backup from the backups of the entities; and restores the application using the virtual disk level backup.

20 Claims, 14 Drawing Sheets

(56) References Cited

U.S. PATENT DOCUMENTS

| | | |
|---|---|---|
| 9,092,248 B1 | 7/2015 | Makin et al. |
| 9,256,725 B2 | 2/2016 | Oprea et al. |
| 9,311,375 B1 | 4/2016 | Naik |
| 9,632,875 B2 | 4/2017 | Raichstein et al. |
| 9,646,256 B2 | 5/2017 | Chamness |
| 9,658,925 B1 | 5/2017 | Damodharan et al. |
| 9,678,965 B1 | 6/2017 | Wartnick et al. |
| 9,740,577 B1 | 8/2017 | Chakraborty et al. |
| 9,805,075 B1 | 10/2017 | Bachu |
| 9,977,704 B1 | 5/2018 | Chopra et al. |
| 10,061,657 B1 | 8/2018 | Chopra et al. |
| 10,146,636 B1 | 12/2018 | Ghare et al. |
| 10,216,583 B1 | 2/2019 | Krinke |
| 10,339,012 B2 | 7/2019 | Hegdal |
| 10,353,619 B1 | 7/2019 | Jha |
| 2004/0098423 A1 | 5/2004 | Chigusa |
| 2007/0239755 A1 | 10/2007 | Mahoney |
| 2008/0244601 A1 | 10/2008 | Zeis |
| 2009/0320029 A1 | 12/2009 | Kottomtharayil |
| 2010/0122248 A1 | 5/2010 | Robinson et al. |
| 2010/0257523 A1 | 10/2010 | Frank |
| 2011/0271150 A1 | 11/2011 | Bourne et al. |
| 2012/0078846 A1 | 3/2012 | Gold et al. |
| 2012/0150996 A1 | 6/2012 | Dubois et al. |
| 2014/0059209 A1 | 2/2014 | Alnoor |
| 2014/0095817 A1 | 4/2014 | Hsu et al. |
| 2015/0154039 A1 | 6/2015 | Zada et al. |
| 2015/0234713 A1 | 8/2015 | Shimada |
| 2016/0048408 A1 | 2/2016 | Madhu et al. |
| 2016/0232061 A1 | 8/2016 | Gaschler et al. |
| 2016/0371153 A1 | 12/2016 | Dornemann |
| 2017/0277597 A1 | 9/2017 | Dillon et al. |
| 2018/0032409 A1 | 2/2018 | Surakanti et al. |
| 2018/0039418 A1 | 2/2018 | Allen et al. |
| 2018/0067819 A1 | 3/2018 | Kotha |
| 2018/0143990 A1* | 5/2018 | Figueroa ............. G06F 11/1464 |
| 2018/0225311 A1 | 8/2018 | Bandopadhyay et al. |
| 2018/0314600 A1 | 11/2018 | Mori |
| 2019/0095452 A1 | 3/2019 | Whitmer |
| 2019/0129711 A1 | 5/2019 | Stopa et al. |
| 2019/0286530 A1 | 9/2019 | Talley et al. |
| 2020/0007620 A1 | 1/2020 | Das et al. |
| 2020/0110638 A1 | 4/2020 | Asthana et al. |
| 2020/0183652 A1 | 6/2020 | Krebs et al. |
| 2020/0286103 A1 | 9/2020 | Sullivan |
| 2020/0288206 A1 | 9/2020 | Bist et al. |
| 2020/0341851 A1 | 10/2020 | Rana |
| 2021/0004400 A1 | 1/2021 | Elkaim et al. |

OTHER PUBLICATIONS

Extended European Search Report issued in corresponding European Application No. 20168729.0, dated Sep. 8, 2020.

Extended European Search Report issued in corresponding European Application No. 20169836.2, dated Sep. 8, 2020.

Dubois, Laura et al, Backup and Recover: Accelerating Efficiency and Driving Down It Costs Using Data Deduplication, Backup and Recover: Accelerating Efficiency and Driving Down IT Costs Using Data Deduplication, 2010, 16, 2010, 16 pages.

Fu, Min et al, Accelerating Restore and Garbage Collection in Deduplication-based Backup Systems, Accelerating Restore and Garbage Collection in Deduplication-based Backup Systems, 2014, 13, 2014, 13 pages.

Roemer et al., Improving Virtual Machine Migration via Deduplication, Improving Virtual Machine Migration via Deduplication, 2014, 6, 2014, 6 pages.

* cited by examiner

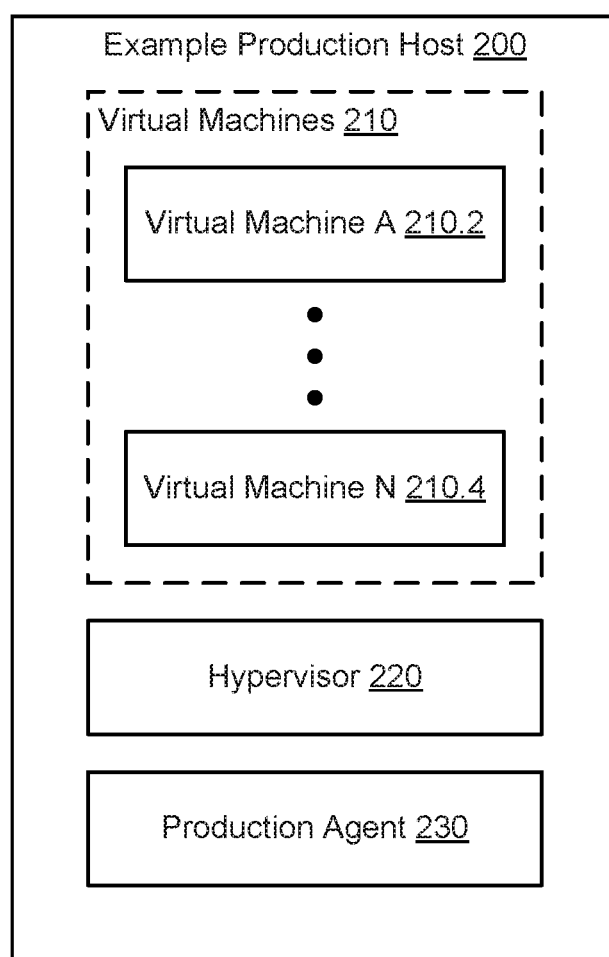
FIG. 2.1

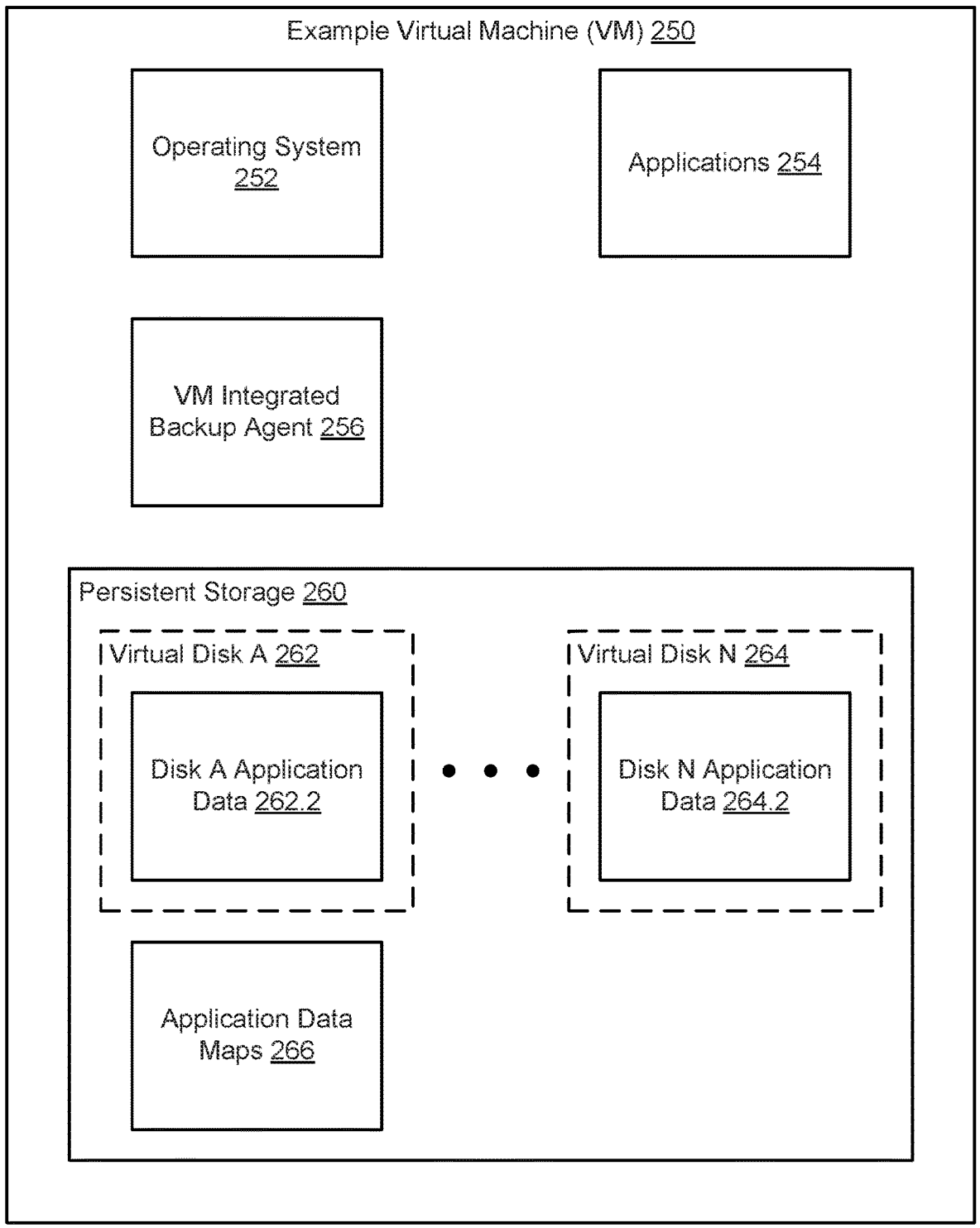
FIG. 2.2

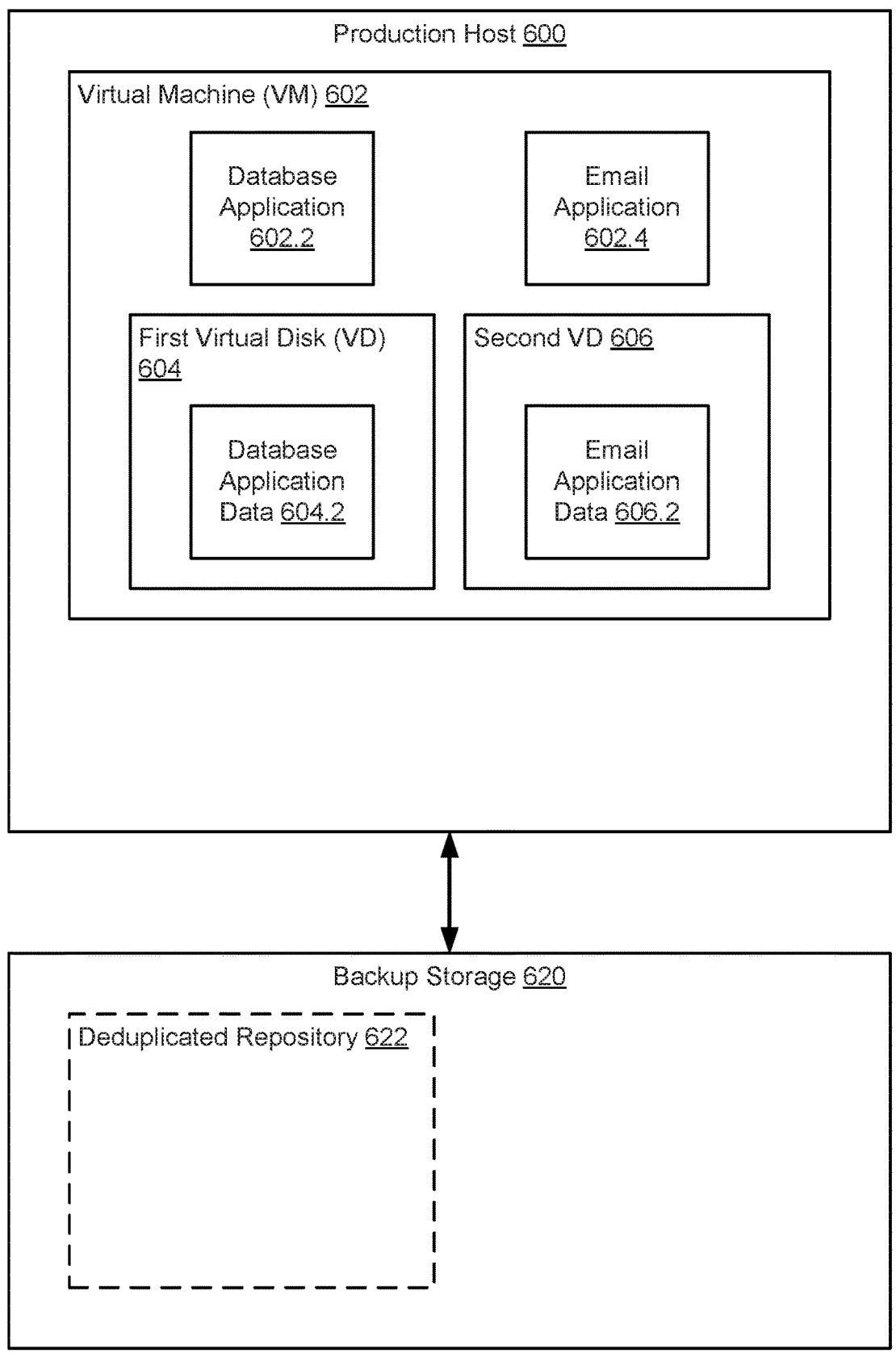
FIG. 6.1

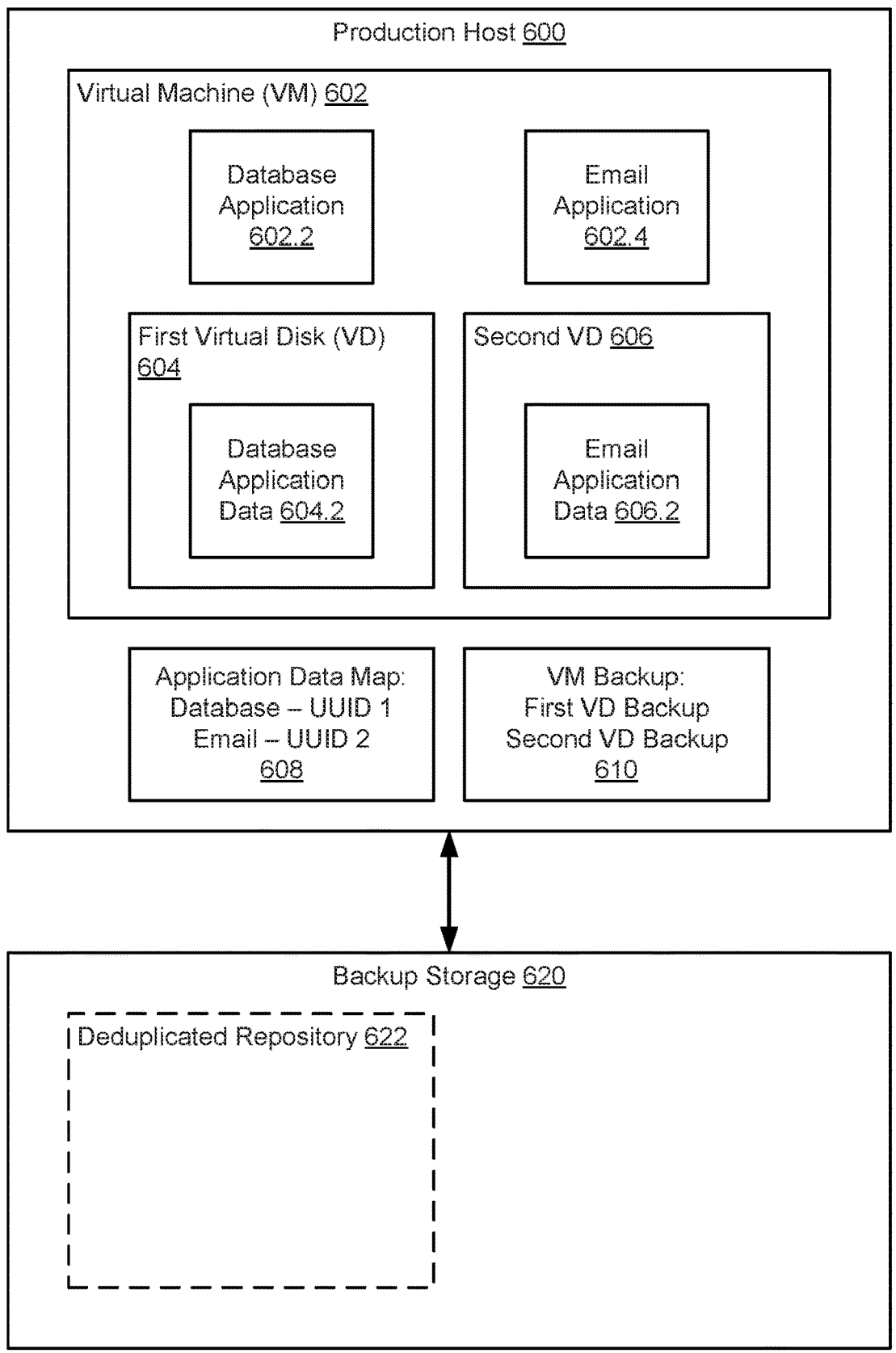
FIG. 6.2

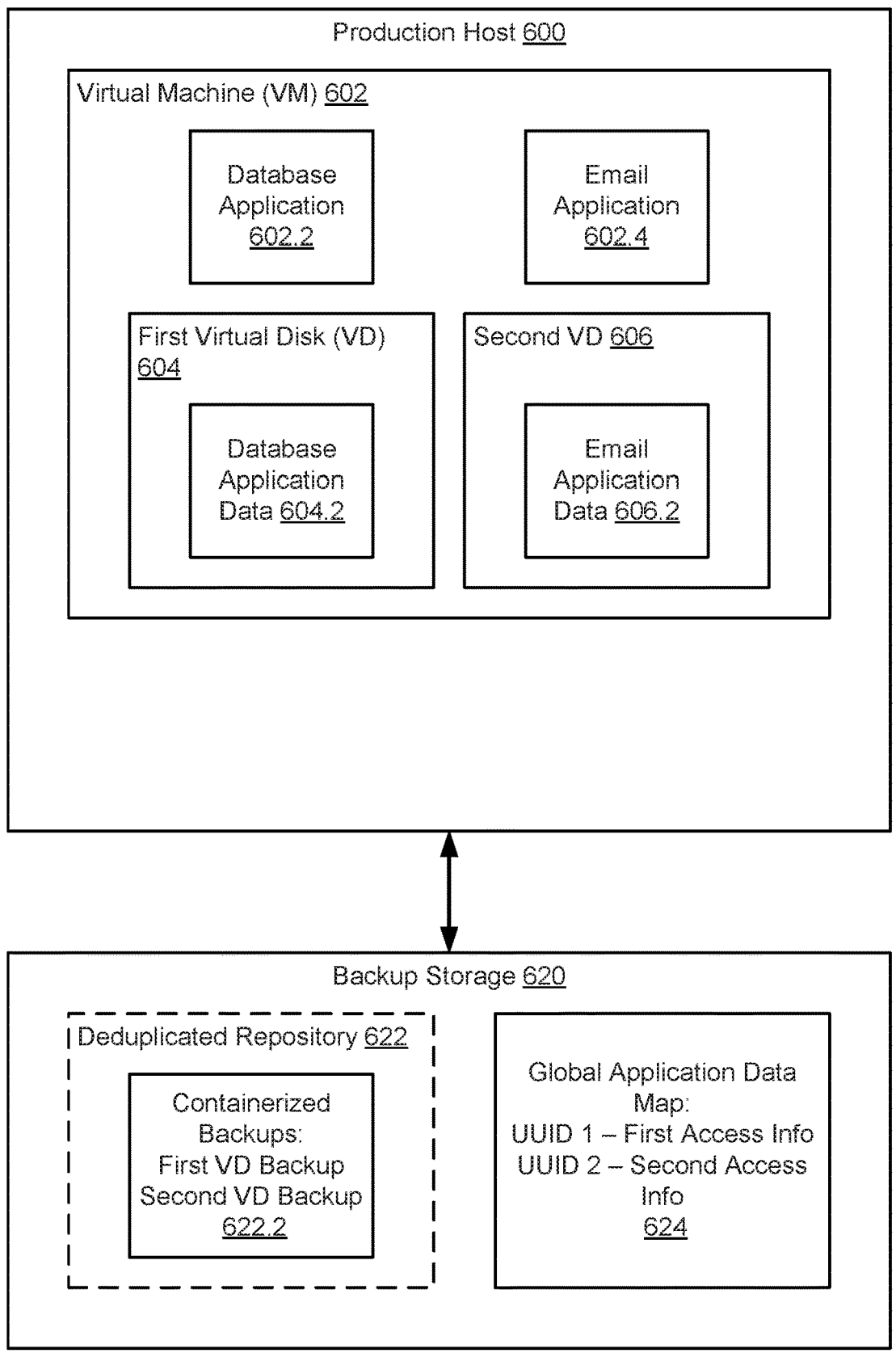
FIG. 6.3

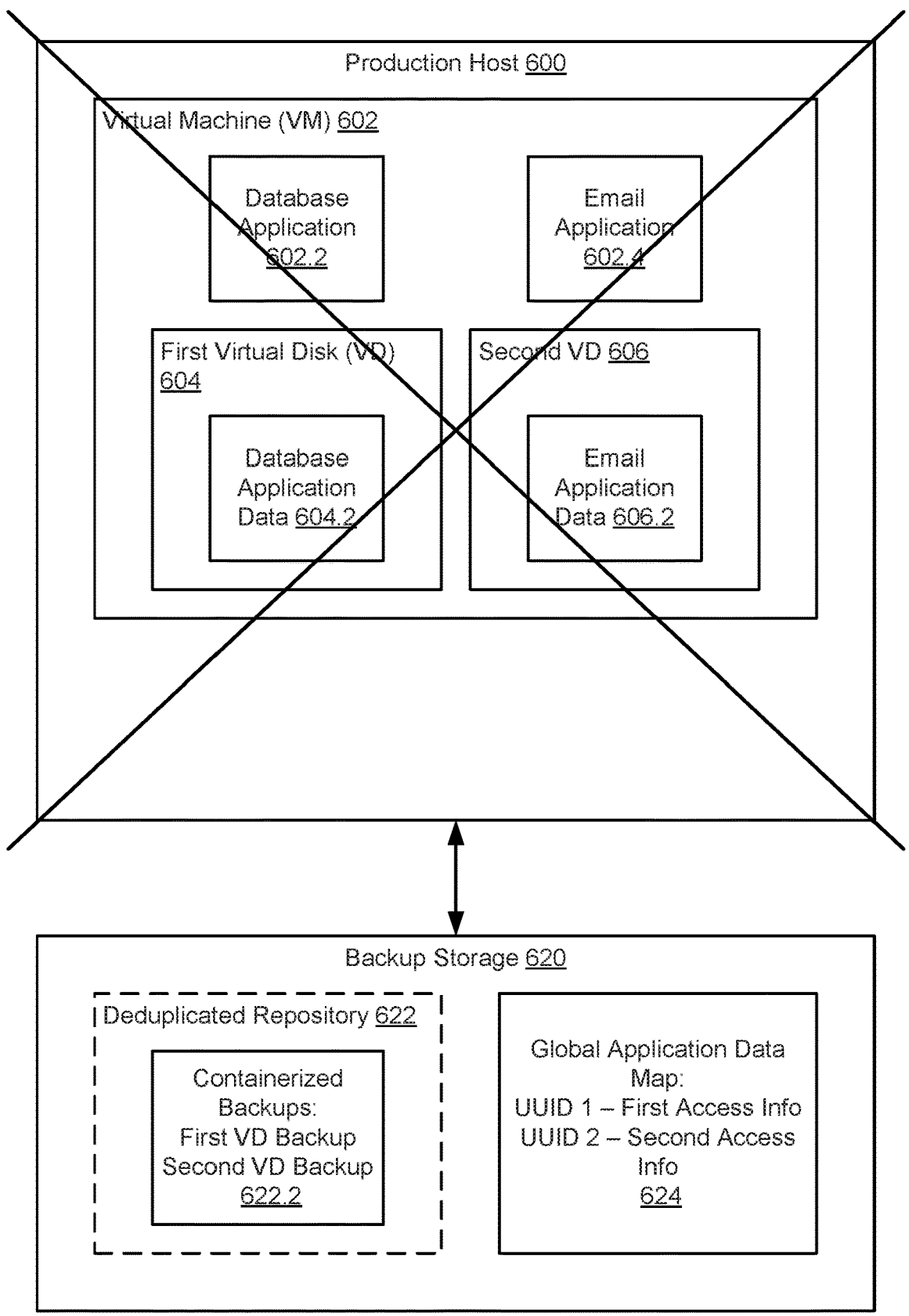
FIG. 6.4

FIG. 6.5

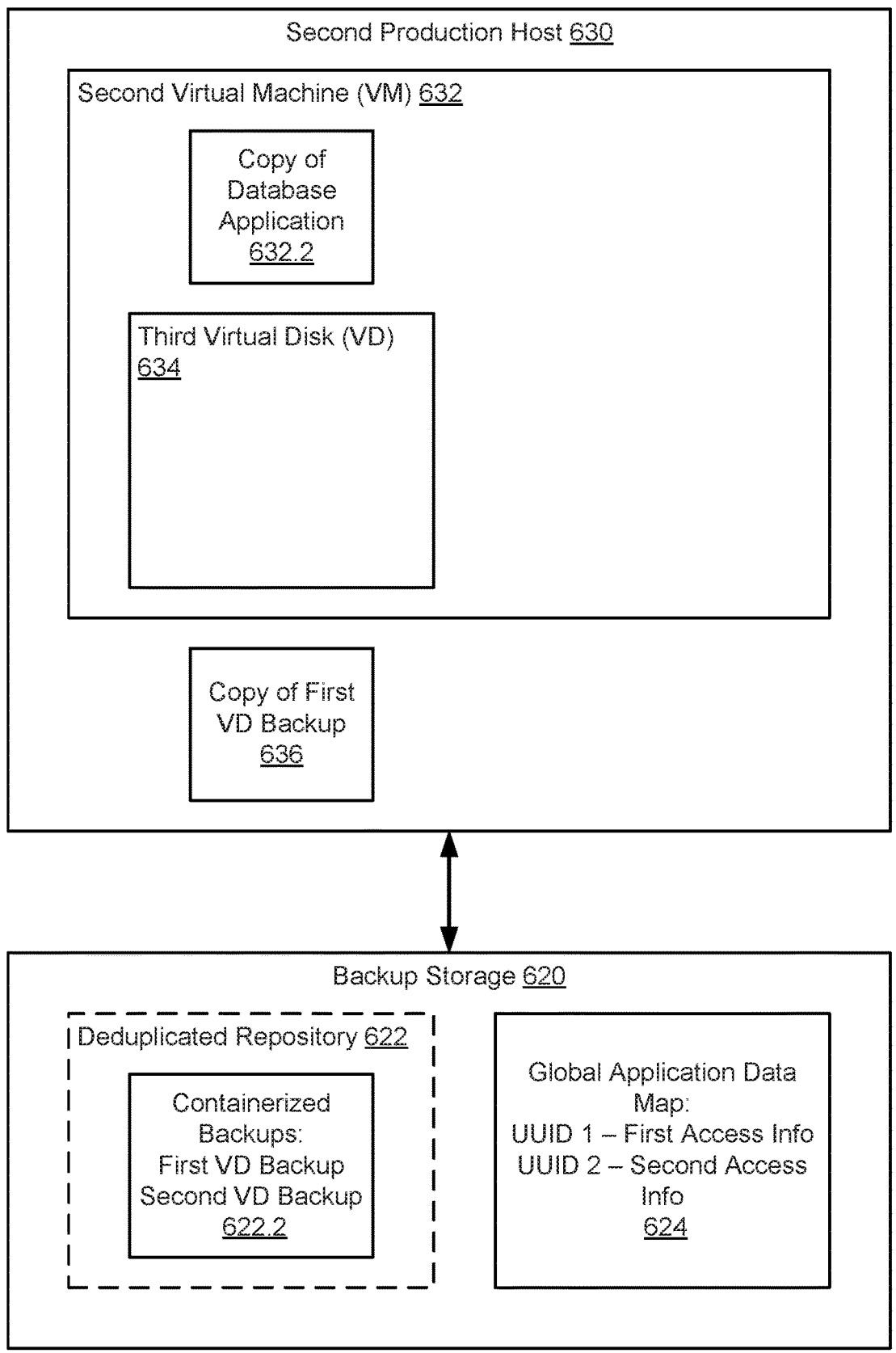
FIG. 6.6

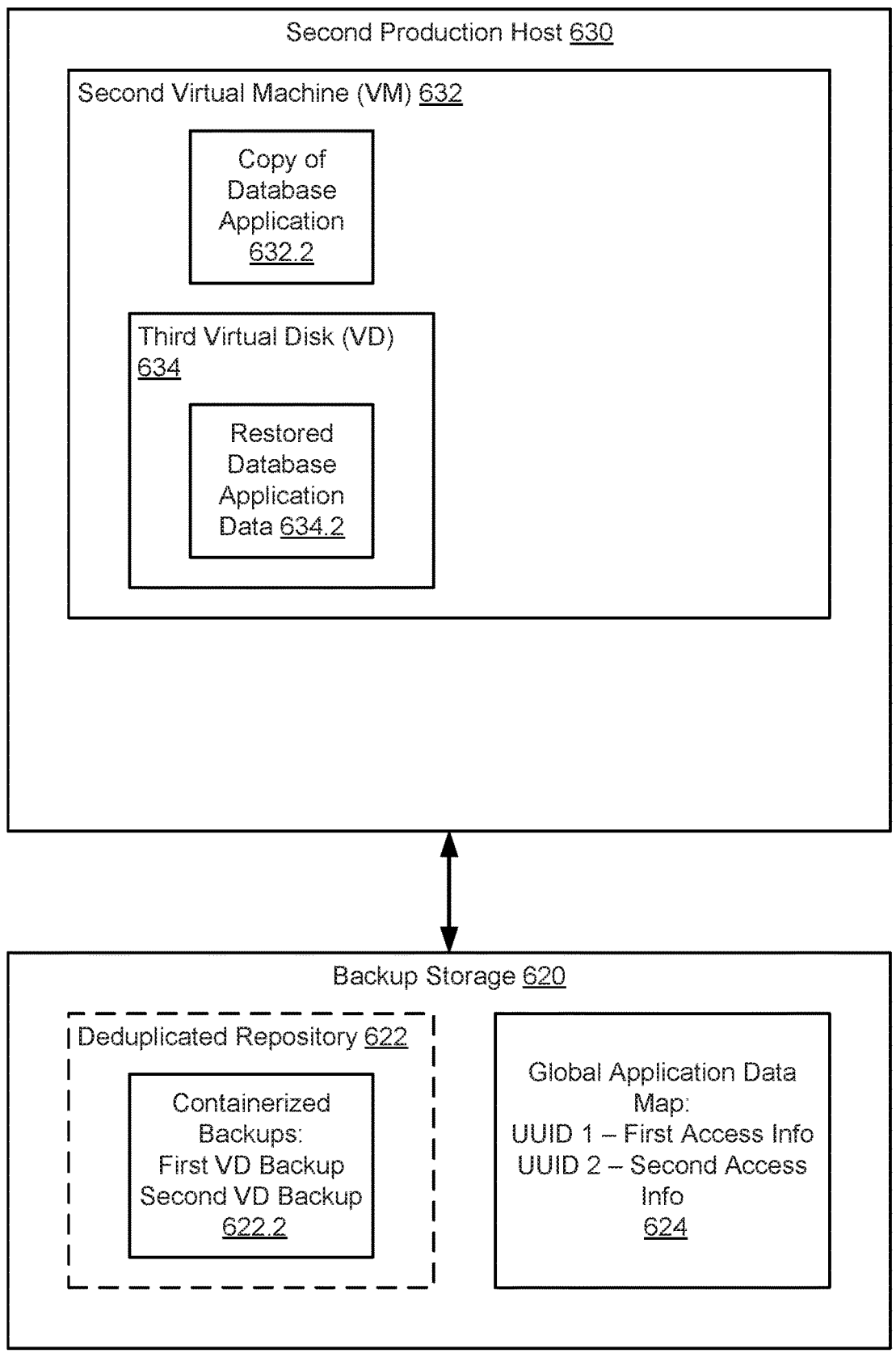
FIG. 6.7

SYSTEM AND METHOD FOR ACCELERATED DATA ACCESS

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

To prevent data loss, copies of data may be stored in multiple locations. For example, a copy of data from a first computing may be stored in a second computing device. Depending on the size of the data, the computational cost for maintaining the copy of the data and providing the copy of the data to address a failure of the first computing device may be high.

SUMMARY

In one aspect, a backup storage in accordance with one or more embodiments of the invention includes a persistent storage and a backup manager. The persistent storage stores backups of entities and a global application data map. The backup manager obtains a restoration request for restoration of an application hosted by an entity of the entities; makes a determination to accelerate the restoration based, at least in part, on the application; in response to the determination: identifies a virtual disk level backup of the entity that is associated with the application using the global application data map; obtains the virtual disk level backup from the backups of the entities; and restores the application using the virtual disk level backup.

In one aspect, a method for restoring an application to a previous state using backups of entities and a global application data map in accordance with one or more embodiments of the invention includes obtaining a restoration request for restoration of the application hosted by an entity of the entities; making a determination to accelerate the restoration based, at least in part, on the application; in response to the determination: identifying a virtual disk level backup of the entity that is associated with the application using the global application data map; obtaining the virtual disk level backup from the backups of the entities; and restoring the application using the virtual disk level backup.

In one aspect, a non-transitory computer readable medium in accordance with one or more embodiments of the invention includes computer readable program code, which when executed by a computer processor enables the computer processor to perform a method for restoring an application to a previous state using backups of entities and a global application data map. The method includes obtaining a restoration request for restoration of the application hosted by an entity of the entities; making a determination to accelerate the restoration based, at least in part, on the application; in response to the determination: identifying a virtual disk level backup of the entity that is associated with the application using the global application data map; obtaining the virtual disk level backup from the backups of the entities; and restoring the application using the virtual disk level backup.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of an example virtual machine in accordance with one or more embodiments of the invention.

FIGS. 6.1-6.7 show a non-limiting example of a system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. The distributed system in accordance with embodiments of the invention may backup data in a small storage footprint format. By doing so, the total quantity of backup data that may be stored by the system may be improved when compared to systems that do not store backup data in a small storage footprint format.

Additional embodiments of the invention may provide a method for performing selective restorations of entities using portions of the backup data stored in the small storage footprint format. For example, embodiments of the invention may provide a method for identifying limited portions of the backup data that are associated with an application. The method may further include selectively obtaining only those portions of the backup data, providing high-performance access to the obtained portions of the backup data, and restoring applications to prior states using the portions of the backup data. By only using limited portions of the backup data for restoration purposes, the computational cost for performing restorations may be reduced when compared to methods that utilize larger quantities of the backup data for performing restorations. Thus, embodiments of the invention may improve the computational efficiency for providing data protection services in a distributed system.

Figure 1:
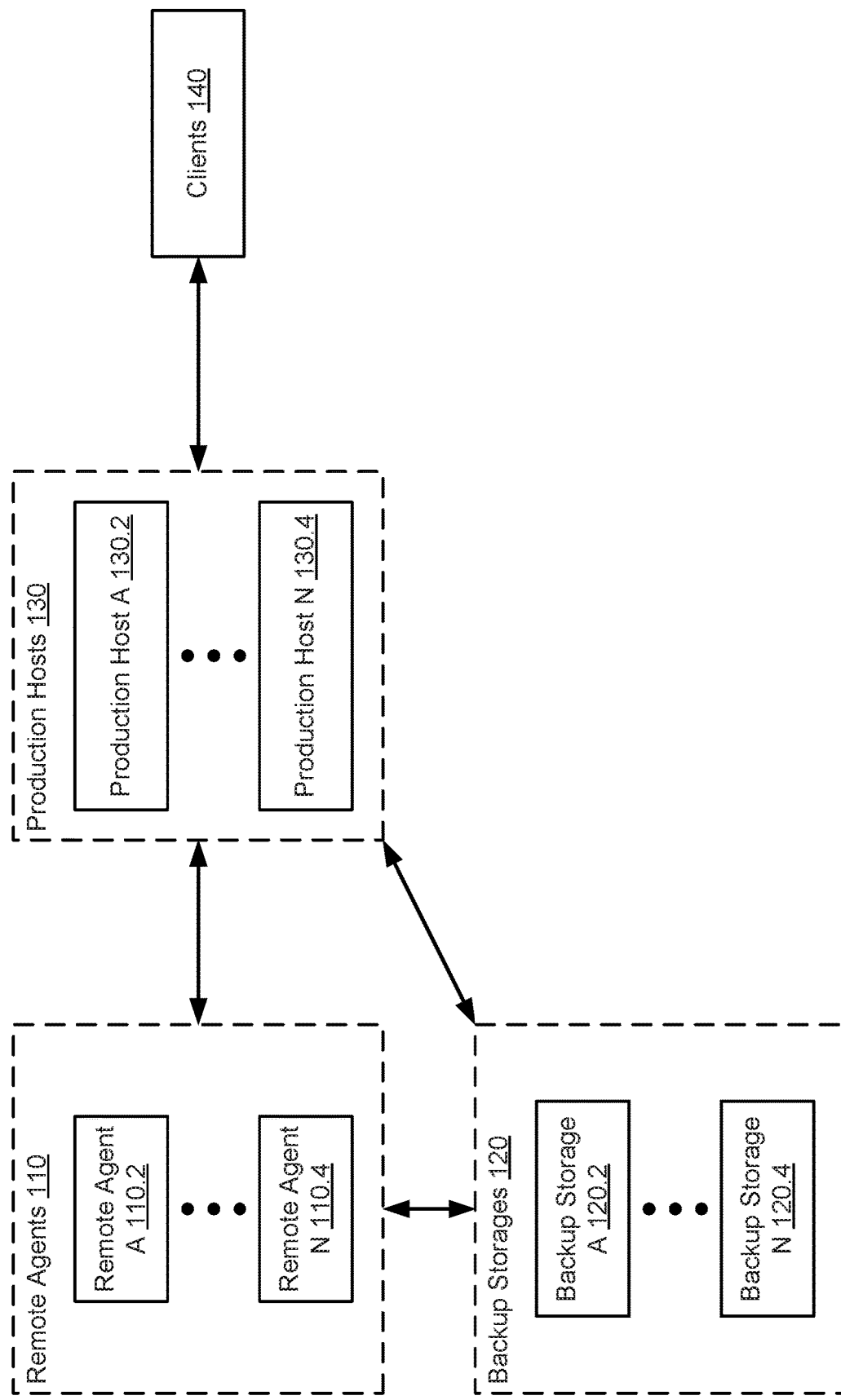
FIG. 1 shows a diagram of a system in accordance with one or more embodiments of the invention.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services of the applications. The applications may be, for example, database applications, electronic communication applications, file storage applications, and/or any other type of application that may provide services to the clients (140). By utilizing such services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host, or all, or a portion, of an entity hosted by the production host, to a previous state. Thus, if data hosted by one of the production hosts (130) is lost, access to the data may be restored by restoring all, or a portion, of the production host using information stored in the backup storages (120).

The system may also include remote agents (110) that provide data protection services to the production hosts (130). The data protection services may include orchestrating generation and storage of backups in the backup storages and/or orchestrating restorations using the data stored in the backup storages (120). Performing a restoration may return the production host, or an entity hosted by the production host, to a previous state.

To maximize the quantity of backup data storable in the backup storages (120), the backups may be stored in a format that is not indexed and/or the data stored in the backup storages (120) may be deduplicated against other data stored in the backup storages (120). By doing so, the footprint of data stored in the backup storages (120) may be reduced which allows a greater quantity of backup data to be stored using the same quantity of storage resources. However, the data stored in all, or a portion, of the backup storages (120) may not be natively searchable in a computationally efficient manner due to the lack of metadata that would otherwise provide for computationally efficient searching of the data.

Figure 3:
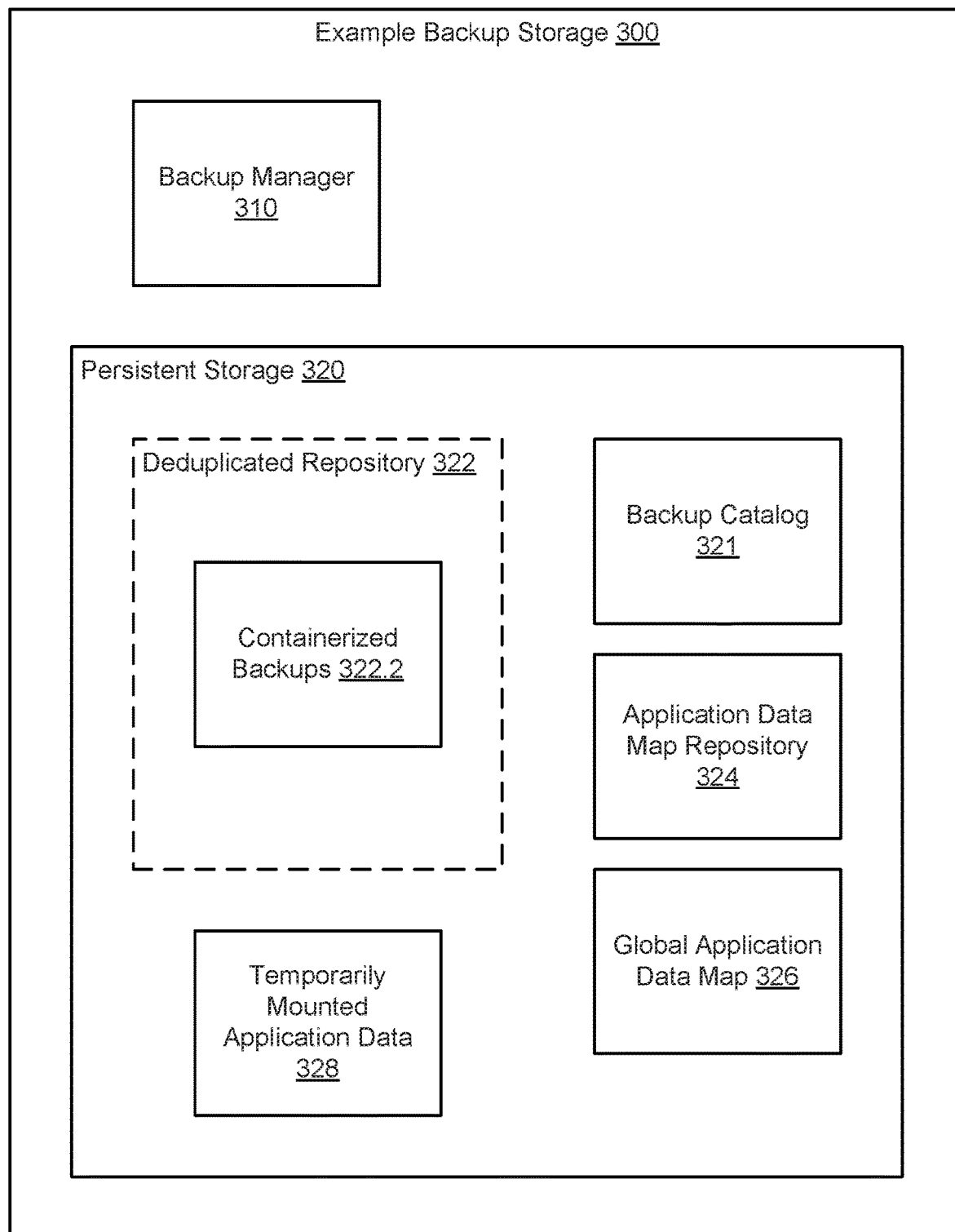
FIG. 3 shows a diagram of an example backup storage in accordance with one or more embodiments of the invention.

To provide for efficient restoration of portions of the data stored in the backup storages (120), the remote agents (110) and/or the backup storages (120) may maintain an index, e.g., a global application data map discussed in greater detail with respect to FIG. 3, that associates portions of the data stored in backup storage with applications hosted by the production hosts. The index may be utilized to selectively restore portions of backups stored in the backup storages (120) in an accelerated manner and/or computationally efficient manner. By doing so, restorations of applications may be performed more quickly and/or at reduced computational cost when compared to contemporary methods.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 4-5. The clients (140) may be other types of computing devices without departing from the invention. For additional details regarding computing devices, refer to FIG. 7.

The clients (140) may be logical devices without departing from the invention. For example, the clients (140) may be virtual machines that utilize computing resources of any number of physical computing devices to provide the functionality of the clients (140). The clients (140) may be other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services, provided by an application hosted by the production hosts (130), by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts, or portions of the production hosts, in the backup storages (120).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 4-5. The production hosts (130) may be other types of computing devices without departing from the invention. For additional details regarding computing devices, refer to FIG. 7.

In one or more embodiments of the invention, the production hosts (130) are distributed computing devices. As used herein, a distributed computing device refers to functionality provided by a logical device that utilizes the computing resources of one or more separate and/or distinct physical computing devices. For example, in one or more embodiments of the invention, the production hosts (130) may be distributed devices that include components distributed across any number of separate and/or distinct computing devices. In such a scenario, the functionality of the production hosts (130) may be performed by multiple, different computing devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may be any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) perform backup services such as, for example, generating and storing backups in backup storages (120). By storing backups in the backup storages (120), copies of data stored in persistent storage of the production hosts (130) may be redundantly stored in the backup storages (120). By redundantly storing copies of data in both the production hosts (130) and the backup storages (120), it may be more likely that the stored data will be able to be retrieved at a future point in time. For example, if a production host (e.g., 130.2) suffers a catastrophic failure or other type of data loss/corruption event, the data on the production host's persistent storage may be lost. However, because a copy of the data may be stored in the backup storages (120), it may be possible to retrieve the data for use after the catastrophic failure. Thus, embodiments of the invention may improve the reliability of data storage in a distributed system.

Backup services may also include generating data maps of data included in the backups stored in the backup storages. The data maps may be utilized by the remote agents (110) and/or the backup storages (120) to generate a global application data map that enables application data included in the backups stored in the backup storages (120) to be restored in a computationally efficient manner. For example, the global application data map may be used to identify portions of the data included in the backup storages (120) that is associated with each of the applications without crawling or otherwise indexing all of the data stored in the backup storages (120). For additional details regarding the production hosts (130), refer to FIG. 2.1.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIG. 4-5. The backup storages (120) may be other types of computing devices without departing from the invention. For additional details regarding computing devices, refer to FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) are distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored by the backup storages (120) includes backups of virtual machines and/or applications hosted by the production hosts (130). For example, the production hosts (130) may host a virtual machine that hosts a database application. To generate backups of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used to restore the application data hosted by the virtual machine hosting the database to a state associated with the backup, i.e., the desired previous state.

One or more embodiments of the invention provide a method for retrieving only a portion of the backups associated with the virtual machine for application restorations. For example, a virtual machine may store data in a number of different virtualized disks. The method for restoration in accordance with embodiments of the invention may facilitate the identification and restoration of only those virtualized disks that include data relevant to a particular application. By doing so, the total quantity of data needed to be obtained from the backup storages (120) for restoration purposes may be reduced when compared to contemporary methods for performing of restorations.

While described above as storing backups of virtual machines, applications, and/or production hosts (130), the backup storages (120) may store other types of data from the production hosts (130), or other entities, without departing from the invention. For example, the backup storages (120) may store archives or other data structures from the clients (140) and/or other entities. For additional details regarding the backup storages (120), refer to FIG. 3

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the remote agents (110) described through this application and all, or a portion, of the methods illustrated in FIG. 4-5. The remote agents (110) may be other types of computing devices without departing from the invention. For additional details regarding computing devices, refer to FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across any number of separate and/or distinct computing devices. In such a scenario, the functionality of the remote agents (110) may be performed by multiple, different computing devices without departing from the invention.

In one or more embodiments of the invention, the backup storages (120) provide the functionality of the remote agents. For example, the backup storages (120) may host applications that provide all, or a portion, of the functionality of the remote agents (110).

In one or more embodiments of the invention, the remote agents (110) orchestrate provisioning of backup services to the production hosts (130). For example, the remote agents (110) may initiate the process of backup generation for the production hosts (130) and storage of the generated backups in the backup storages (120). Additionally, the remote agents (110) may orchestrate restoration of the production hosts (130) and/or entities hosted by the production hosts using backups stored in the backup storages (120). For example, remote agents (110) may initiate copying of backups from the backup storages to the production hosts (130) and may initiate restorations using the copied backups. The system of FIG. 1 may include any number of remote agents (e.g., 110.2, 110.4).

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2.1 shows a diagram of an example production host (200) in accordance with one or more embodiments of the invention. The example production host (200) may be similar to any of the production hosts (130, FIG. 1). As discussed above, the example production hosts (200) may provide: (i) application services to the clients, (ii) backup services to the entities that provide the application services to the clients, and (iii) restoration services.

To provide the aforementioned functionality of the example production host (200), the example production host (200) may include virtual machines (210), a hypervisor (220), and a production agent (230). Each component of the example production host (200) is discussed below.

The virtual machines (210) may be applications. For example, the virtual machines (210) may be applications executing using physical computing resources of the example production host (200) and/or other entities. In other words, each of the virtual machines (210) may be implemented as computer instructions stored on a persistent storage that when executed by a processor of the example production host (200) and/or other entities give rise to the functionality of the respective virtual machine. The example production host (200) may host any number of virtual machines (e.g., 210.2, 210.4) without departing from the invention.

Each of the virtual machines (210) may host any number of applications. The applications may provide application services to clients or other entities. For example, the applications may be database applications, electronic communication applications, filesharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or a portion, of the applications provide application services to clients. The provided services may correspond to the type of application of each of the applications. When providing application services to the clients, data that is relevant to the clients may be received by and/or generated by the applications. The applications may store such relevant data as part of the application data associated with respective applications in persistent storage of the example production host (200) and/or other entities.

In some embodiments of the invention, portions, or all, of the application data may be stored remotely from the example production host (200). For example, the application data may be stored in a second production host, or another entity, that does not host the applications. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized entity, e.g., one of the virtual machines (210).

Each of the virtual machines (210.2, 204.4) may also generate application data maps. The application data maps may include information that enables a portion of the data stored by backup storages that corresponds to previously stored application data to be identified. The information included in the application data maps may be used to selectively restore data associated with an application while minimizing the quantity of data restored that is not useful for restoring a particular application. For additional details regarding the virtual machines (210), refer to FIG. 2.2.

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210.2, 210.4).

For example, the hypervisor (220) may allocate a portion of the persistent storage of the example production host (200). Any quantity of storage resources of the persistent storage may be allocated in any manner among the virtual machines (e.g., 210.2, 210.4).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services to the virtual machines (210) and/or entities hosted by the virtual machines (210). For example, the production agent (230) may orchestrate the generation of backups and storage of the generated backups in backup storages (120, FIG. 1). To orchestrate the generation of backups, the production agent (230) may generate virtual machine level backups. A virtual machine level backup may be a backup that represents the state (or difference from one state to another state) of a virtual machine at a point in time. A virtual machine level backup may be discretized at a virtualized disk level, i.e., different portions of the generated backup may correspond to different virtualized disks used by the virtual machine for data storage purposes. Thus, multiple virtualized disk level backups may be portions of a virtual machine backup. As will be discussed in greater detail below, the application data maps may include information that associates the virtual disk level backups to a different application. By doing so, information that is relevant to selectively identifying backups stored in backup storage may be created and saved for use in application level restorations.

In one or more embodiments of the invention, the production agent (230) manages the provisioning of backup services for the virtual machines (210) based on instructions received from one or more remote agents. These instructions may cause the production agent (230) to take action to provide the backup services. In other words, the production agents (230) may orchestrate data protection services including generation of backups and performance of restorations across the system.

In one or more embodiments of the invention, the production agent (230) includes functionality to report backup generation activity to remote agents. For example, the production agent (230) may monitor backups that are generated and send notifications of the generated backups to the remote agents. By doing so, remote agents may be notified of the backup generations for the entities hosted by the example production host (200).

The production agent (230) may also provide restoration services. Restoration services may enable entities that are now inaccessible due to, for example, failure of a host entity such as a production host to be instantiated in other locations and being in predetermined states. To provide restoration services, the production agent (230) may obtain any number of backups from backup storage and restore the entity using the backups. For example, a production agent (230) may obtain a virtual machine level backup and instantiate a copy of a virtual machine using the obtained backup. By doing so, a virtual machine may be restored in a state hosting an application in a predetermined state. Once in the predetermined state, the application may provide desired application services and/or enable access to application data of the application. The entities may be restored to different, desirable states using different combinations of previously generated backups and/or portions of the backups. For example, a portion of a backup corresponding to application data may be used to selectively restore an application hosted by a virtual machine by modifying the data of the virtual machine using the portion of the backup. In this manner, both virtual machine level and application level restorations may be performed. Any combination of backups may be used to restore entities to any number of states without departing from the invention.

Figure 4:
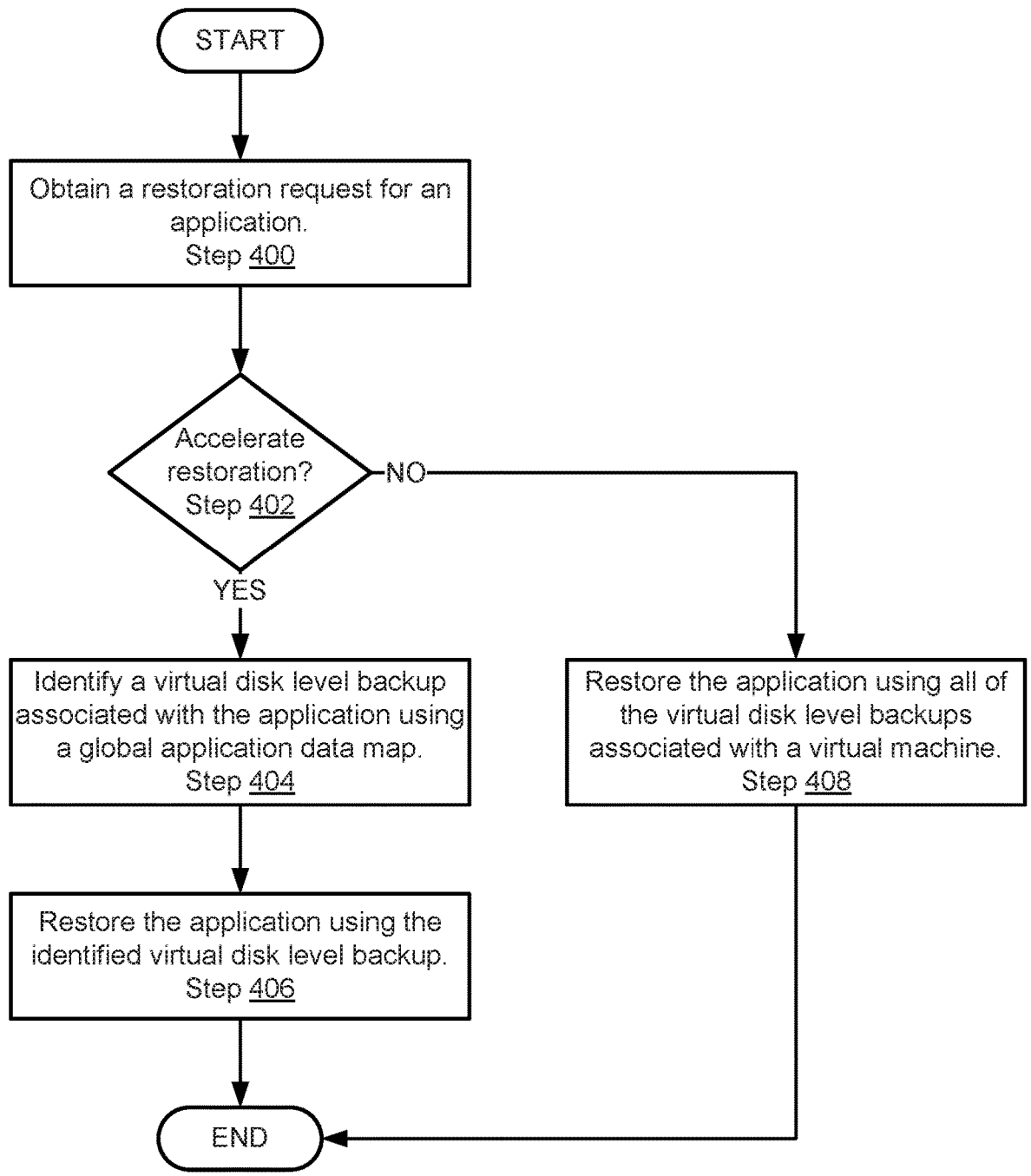
FIG. 4 shows a flowchart of a method of performing a restoration of an application in accordance with one or more embodiments of the invention.
Figure 5:
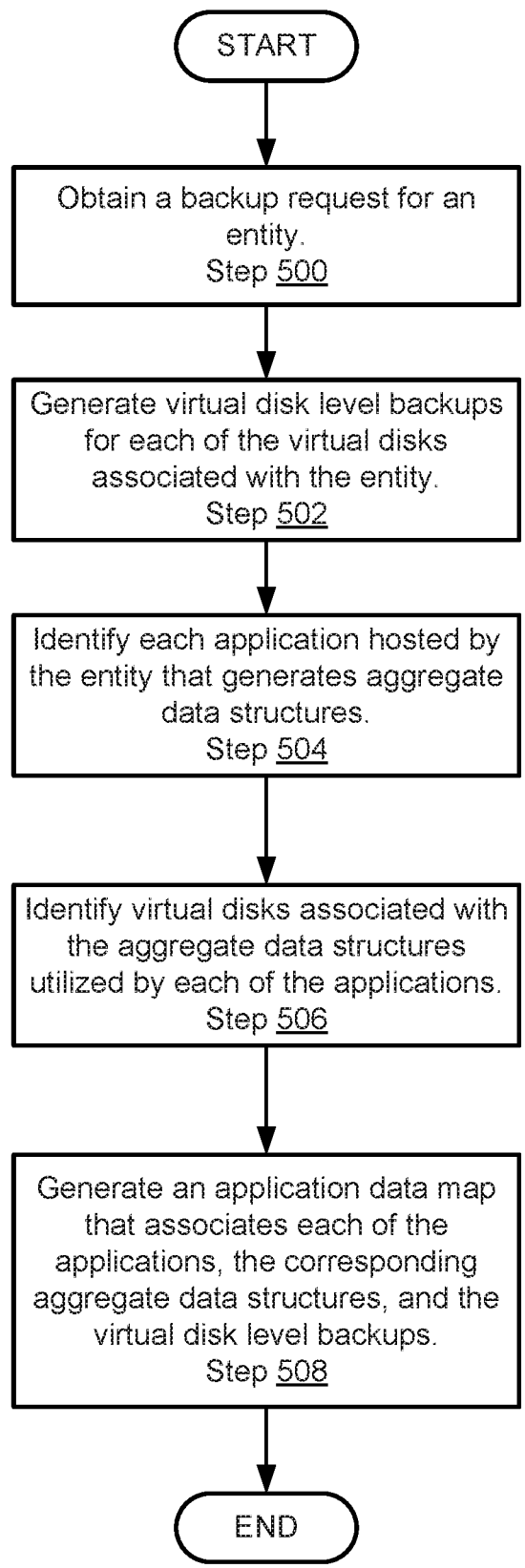
FIG. 5 shows a flowchart of a method of responding to a backup generation request in accordance with one or more embodiments of the invention.

To provide the above noted functionality of the production agent (230), the production agent (230) may perform all, or a portion, of the methods illustrated in FIGS. 4-5.

In one or more embodiments of the invention, the production agent (230) is a hardware device including circuitry. The production agent (230) may be, for example, a digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be a hardware processor including circuitry such as, for example, a central processing unit or a microcontroller. The processor may be other types of hardware devices for processing digital information without departing from the invention.

While the example production host (200) of FIG. 2.1 has been described and illustrated as including a limited number of components for the sake of brevity, a production host in accordance with embodiments of the invention may include additional, fewer, and/or different components than those illustrated in FIG. 2.1 without departing from the invention.

As discussed above, virtual machines hosted by the production hosts may provide services to clients. FIG. 2.2 shows a diagram of an example virtual machine (250) in accordance with one or more embodiments of the invention.

The example virtual machine (250) may host an operating system (252) that manages operations of the example virtual machine (250). For example, the operating system (252) may manage access to resources such as persistent storage (260). The persistent storage (260) may include logical partitions such as virtual disks (e.g., 262, 264). When managing resources access, the operating system may provide storage resources to the applications (254) for storing application data (e.g., 262.2, 264.2) in the virtual disks (262, 264). The operating system (252) may manage resource access for the storage of other types of data in the virtual disks (262, 264) without departing from the invention.

The example virtual machine (250) may host any number and type of applications (254). The applications (254) may provide services to clients and/or other entities. The applications (254) may generate application data (e.g., 262.2, 264.2) which is stored in the virtual disks (262, 264) that are stored in the persistent storage (260).

The example virtual machine (250) may also host a virtual machine integrated backup agent (256). The virtual machine integrated backup agent (256) may provide data protection services including (i) generation of application data maps (266) and (ii) restoration of the applications (254) using previously generated backups. The application data maps (266) may be data structures that include information that may be used to identify backups of the virtual disks (262, 264) that store application data associated with each of the applications (254). The application data maps (266) may be used by backup storages to selectively obtain data from previously stored backups that may be used to restore different applications.

To generate application data maps (266), the virtual machine integrated backup agent (256) may (i) query the operating system (252) to determine where application data (e.g., 262.2, 264.2) associated with each application is stored, (ii) when a backup is generated for the example virtual machine (250), create an association between each virtual drive level backup of the backup that stores application data to the corresponding application.

For example, consider a scenario in which a first application of the applications (254) stores application data in virtual disk A (262). When a backup of the example virtual machine (250) is generated, the backup may include a first portion that includes information associated with virtual disk A (262) and a second portion that includes information associated with virtual disk N (264). To generate the association, the virtual machine integrated backup agent (256) may obtain a universally unique identifier (UUID) from a backup storage that will store the first portion of the backup. The backup storage may utilize the (UUID) for indexing purposes for all of the backup data. Once obtained, the association may be generated by relating the obtained UUID to the application. The generated relation may be used to update the application data maps (266). Consequently, the application data maps (266) may be used to identify the UUID, and any other UUIDs, associated with a particular application. In turn, the identified UUIDs may be used to only obtain the virtual disk level backups, from the backup storage, for restoration purposes. The application data maps (266) may be generated via other methods without departing from the invention. For example, virtual machine integrated backup agent (256) may provide UUIDs to backup storages rather than obtaining the UUIDs from the backup storages, or other entities.

In one or more embodiments of the invention, one or more of the application data maps (266) are sent along with backups to the backup storages when a backup for the example virtual machine (250) is performed. As will be discussed in greater detail with respect to FIG. 3, the application data maps (266) may be used to generate an index of all of the portions, e.g., virtual disk level backups, of the backups in backup storages that include information associated with each application of the system of FIG. 1.

In one or more embodiments of the invention, the persistent storage (260) is a logical storage (e.g., virtualized storage) that utilizes any quantity of hardware storage resources of a production host (and/or other entity) that hosts the example virtual machine (250). For example, the persistent storage (260) may utilize portions of any combination of hard disk drives, solid state disk drives, tape drives, and/or any other physical storage medium of a production host and/or other entity for providing storage resources. Such storage resources may be used to host any number of virtual disks (262, 264), application data maps (266), and/or other data structures.

As discussed above, backups and/or data maps may be sent to backup storages for data integrity purposes. FIG. 3 shows a diagram of an example backup storage (300) in accordance with one or more embodiments of the invention. The example backup storage (300) may be similar to any of the backup storages (120, FIG. 1). As discussed above, the example backup storage (300) may store data such as backups that may be used for restoration purposes. Additionally, the example backup storage (300) may utilize the stored backups for restoration purposes.

To provide the aforementioned functionality of the example backup storage (300), the example backup storage (300) may include a backup manager (310) and a persistent storage (320). Each component of the example backup storage (300) is discussed below.

In one or more embodiments of the invention, the backup manager (310) provides data storage services. For example, the backup manager (310) may orchestrate the storage of backups from production hosts in persistent storage (320) resulting in the storage of backups. As discussed above, each backup may include any number of virtual disk level backups which, in turn, store different portions of application data and/or other types of data.

When providing data storage services, the backup manager (310) may deduplicate the backups against already-stored backups. To deduplicate the backups for storage, the backup manager (310) may divide the backups into any number of portions, comparing those portions to existing portions of data stored in a deduplicated repository (322), and only store the portions of the backups that are not duplicative of existing portions already stored in the deduplicated repository (322). Additionally, the example backup storage (300) may store instructions regarding how to combine different portions of data stored in the deduplicated repository (322) to obtain backups stored in a deduplicated manner in the deduplicated repository (322). By doing so, more backups may be stored in the example backup storage (300).

Additionally, to further improve the efficiency of storing data, the backup manager (310) may store the backups in a containerized format. For example, containerized backups (322.2), after deduplication, may be stored in the deduplicated repository (322). The containerized format may not include metadata or other information regarding the contents of each container of the containerized format. Rather, a containerized format may store volume data in discrete containers without including information regarding the structure of the data inside of each container. By doing so, the containerized format may have a smaller storage footprint when compared to other formats (e.g., file systems). Consequently, more backups may be stored as containerized backups (322.2) when compared to storing the backups in other formats that include metadata regarding the data.

However, the information included in the containerized backups may not be natively indexable.

To provide a level of indexability, the backup manager (310) may generate a backup catalog (321) that stores information that enables backups to be retrieved on a virtual disk level. In other words, file-level access may not be available, but virtualized disk level indexing may be provided. In other words, the portions of data stored in the deduplicated repository (322) associated with each virtual disk level backup may be obtained using the backup catalog (321). By doing so, the total quantity of metadata may be minimized while still enabling indexing for virtual drive level aggregations of data to be provided.

The backup catalog (321) may be generated by the backup manager (310) as backups are obtained from production hosts. As discussed with respect to FIG. 2.2, the data of each virtual machine may be logically divided into any number of virtual disks. Consequently, when a backup is obtained, appropriate location information may be added to the backup catalog (321) so that all of the data of any virtual disk level backup may be selectively obtained from the deduplicated repository (322) in a computationally efficient manner, e.g., no need to crawl the data of the deduplicated repository (322) to identify data associated with any particular virtual disk.

To provide the ability to selectively obtain data from the deduplicated repository to restore an application, the backup manager (310) may generate the global application data map (326) using the application data maps obtained from the production hosts. The application data maps, upon receipt, may be stored in the application data map repository (324). The backup manager (310) may use each of the application data maps to construct the global application data map (326).

The global application data map (326) may specify the associations between applications and the backups of the virtual disks stored in the deduplicated repository (322). Upon identification of all of the backups of the virtual disks that are associated with a particular application, the backup catalog (321) may be used to obtain the backups of the virtual disks from the deduplicated repository (322). By doing so, all of the data that is relevant for restoring a particular application may be selectively obtained from the deduplicated repository (322). Such data may be used for restoration purposes, as will be described in greater detail below and with respect to FIG. 4.

In one or more embodiments of the invention, the backup manager (310) provides restoration services for the virtual machine and application hosted by virtual machines. Restoration services may include providing data stored in the deduplicated repository (322) that may be used to restore the virtual machine and/or application to a desired state. When providing application restoration services, the backup manager (310) may perform all, or a portion of the methods of FIGS. 4-5.

When providing restoration services for an application, the backup manager (310) may selectively obtain data from the deduplicated repository (322) using the global application data map (326) and the backup catalog (321), locally mount the obtained data to obtain temporarily mounted application data (328), and provide the temporarily mounted application data (328) to a production host to restore an application using the temporarily mounted application data (328). The temporarily mounted application data (328) may only include a portion of the data of the backup (from which the data now-being used to restore the application was obtained) of the virtual machine that hosted the application when the backup was generated. Specifically, the temporarily mounted application data (328) may only include the data of the virtual disks of the virtual machine that stored data associated with the application, not all of the virtual disks of the virtual machine. By doing so, the total quantity of data for restoring the application is reduced when compared to utilizing the data of all of the backups of virtual drives of the virtual machine for restoration purposes.

In one or more embodiments of the invention, the backup manager (310) is a hardware device including circuitry. The backup manager (310) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

In one or more embodiments of the invention, the persistent storage (320) is a data storage device. For example, the persistent storage (320) may be any combination of hard disk drives, solid state disk drives, tape drives, and/or any other physical storage medium for the storage of data. The persistent storage (320) may store the deduplicated repository (322), the backup catalog (321), the application data map repository (324), the global application data map (326), and the temporarily mounted application data (328). Each of these data structures is discussed below.

The deduplicated repository (322) may be a data structure that includes deduplicated data. As discussed above, deduplicating data may reduce the footprint of the data. However, duplication may be a computationally expensive process and obtaining data from a deduplicated repository (322) may also be computationally expensive. For example, the process of determining whether a portion of data is duplicative of data in the deduplicated repository (322) may consume significant processing, memory, and storage resources. Similarly, the process of obtaining data by stitching together any number of portions of data stored in the deduplicated repository (322) may be computationally expensive. Accordingly, it may not be computationally reasonable to crawl data stored in a deduplicated repository (322) for search purposes, e.g., to identify only those portions of data in the deduplicated repository (322) that are useful for restoring an application.

The deduplicated repository (322) may also store the deduplicated backups in a containerized format, e.g., containerized backups (322.2). As discussed above, the containerized format may be a data storage format that reduces overhead of storing data by minimizing metadata. Data in a containerized format may be stored in logical containers which improves the amount of data that may be stored when compared to other methods of storing data such as via a file system that includes metadata which provides for native searchability of the stored data.

The backup catalog (321) may be a data structure, as noted above, that enables virtual disk level backups to be obtained from the deduplicated repository. For example, the backup catalog (321) may be a list that associates each backup of a virtual disk with (i) a unique identifier and (ii) information that may be used to retrieve the backup of the virtual disk from the deduplicated repository (322). The information may be, for example, a listing of all of the portions of containers that store portions of each virtual disk backup and the portions. The backup catalog (321) may store other types of information that may be used to retrieve the backups of each virtual disk from the deduplicated repository (322) without departing from the invention.

The application data map repository (324) may be a data structure that includes application data maps from production hosts. The application data map repository (324) may include any quantity of application data maps. The application data maps may be deleted, or retained, after being used to update the global application data map (326).

The global application data map (326) may be a data structure that includes information derived from the application data map repository (324) that enables the backup catalog (321) to be utilized to selectively obtain virtual drive level backups from the deduplicated repository (322) that store application data associated with each application.

The temporarily mounted application data (328) may be application data obtained from any number of virtual drive level backups that are associated with a particular application. The temporarily mounted application data (328) may include information necessary to restore an application to a previous state. The example backup storage (300) may include any number and/or quantity of temporarily mounted application data (328) associated with any number of applications. By doing so, any number of different applications may be restored using the temporarily mounted application data (328). The contents of the temporarily mounted application data (328) may change as different application are restored.

While the example backup storage (300) of FIG. 3 has been described and illustrated as including a limited number of components for the sake of brevity, a backup storage in accordance with embodiments of the invention may include additional, fewer, and/or different components than those illustrated in FIG. 3 without departing from the invention.

Returning to FIG. 1, the backup storages may provide data storage and restoration services. FIG. 4 illustrates a method that may be performed by components of the system of FIG. 1 when providing such services.

FIG. 4 shows a flowchart of a method in accordance with one or more embodiments of the invention. The method depicted in FIG. 4 may be used to provide restoration services in accordance with one or more embodiments of the invention. The method shown in FIG. 4 may be performed by, for example, a backup storage (e.g., 120, FIG. 1). Other components of the system illustrated in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a restoration request for an application is obtained.

In one or more embodiments of the invention, the restoration request is obtained from a remote agent. The remote agent may be orchestrating restoration of the application. The application may have been posted by a virtual machine of a production host. One or more backups associated with the virtual machine may be stored in backup storage. Each of the one or more backups associated with the virtual machine may include one or more virtual drive level backups. At least one of the one or more virtual drive level backups includes information that may be used to restore the application to a desired state.

In step 402, it is determined whether to accelerate the restoration.

In one or more embodiments of the invention, a restoration may be accelerated by only utilizing a portion of the data of the backups associated with the virtual machine for the restoration. In other words, not all of the data of the backups associated with the virtual machine may be used to restore the application. Consequently, a smaller amount of data may be used for restoration purposes when an accelerated restoration is performed.

In one or more embodiments of the invention, the determination is made based on the type of the application. For example, a list of applications that are to be accelerated for restoration purposes may be used to make a determination.

In one or more embodiments of the invention, the determination is made based on an indication included in the restoration request. For example, a restoration request may specify whether or not the restoration is to be accelerated.

If it is determined that the restoration is to be accelerated, the method may proceed to step 404. If it is determined that the restoration is not to be accelerated, the method may proceed to step 408.

In step 404, a virtual disk level backup associated with the application is identified using a global application data map.

In one or more embodiments of the invention, the virtual disk level backup associated with the application is identified by searching the global application data map based on the application. Searching the global application data map may provide one or more (UUIDs) associated with the application. The one or more UUIDs may be used to search a backup catalog. Searching the backup catalog using the UUIDs may provide retrieval information associated with one or more virtual disk level backups stored in backup storage. The retrieval information may be used to obtain one or more virtual disk level backups that include, at least in part, information that may be used to restore the application to a previous state, the virtual disk level backup may be any of the obtained one or more virtual disk level backups.

In step 406, the application is restored using the identified virtual disk level backup.

In one or more embodiments of the invention, the application is restored by locally mounting the identified virtual disk level backup. Once mounted, remote access to the virtual disk level backup may be provided to a production host that hosts a virtual machine. The virtual machine may host an instance of the application. Once remote access is provided, the virtual disk level backup may be used to obtain backup data for the application. The backup data may be used to restore the instance of the application hosted by the virtual machine to the state associated with the backup data.

In one or more embodiments of the invention, the application is restored by sending a copy of the virtual disk level backup to a production host. The production host may use the copy of the virtual disk level backup to obtain backup data associated with the application. The backup data may be used to restore an instance of the application to a predetermined state associated with the backup data.

While steps 404 and 406 have been described with respect to a single virtual disk level backup, multiple virtual disk level backups may be obtained and used to restore an application without departing from the invention.

The method may end following step 406.

Returning to step 402, the method may proceed to step 408 if it is determined that the restoration is not to be accelerated.

In step 408, the application is restored using all of the virtual disk level backups associated with a virtual machine. The virtual machine may be the entity from which all of the virtual law disk level backups were generated. In other words, all of the virtual disk level backups, rather than only those that store information relevant to the application, may be used to restore the application.

In one or more embodiments of the invention, all of the virtual disk level backups associated with the virtual machine are used to restore the application by sending copies of all of the virtual disk level backups to a production host. The production host may use all of the virtual disk level backups during restoration of the application.

The method may end following step 408.

By implementing the method of FIG. 4, restorations of applications may be performed by selectively obtaining backup data. Doing so may reduce the computational load for providing application level restoration services when compared to methods for performing restoration services that do not selectively obtain backup data.

As discussed above, production hosts may generate backups and/or application data maps. FIG. 5 shows a flowchart of a method in accordance with one or more embodiments of the invention. The method depicted in FIG. 5 may be used to respond to a backup generation request in accordance with one or more embodiments of the invention. The method shown in FIG. 5 may be performed by, for example, a production host (e.g., 120, FIG. 1). Other components of the system illustrated in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a backup request for an entity is obtained.

In one or more embodiments of the invention, the backup request may be obtained from a remote agent. The remote agent may send a request in accordance with a backup schedule for the entity.

In one or more embodiments of the invention, the entity is a virtual machine. The entity may host an application. The application may store application data in one or more virtual disks of the virtual machine.

In step 502, virtual disk level backups are generated for each of the virtual disks associated with the entity. As noted above, the entity may have any number of associated virtual disks. One or more of the virtual disks may include application data associated with an application hosted by the entity.

In step 504, each of the applications hosted by the entity that generate aggregate data structures are identified.

In one or more embodiments of the invention, an aggregate data structure is repository of data utilized by an application. For example, a database may be an aggregate data structure for a database application. In another example, an electronic mail archive may be an aggregate data structure for electronic mail application.

In step 506, virtual disks associated with the aggregate data structures that are utilized by each of the applications are identified. In other words, associations between the virtual disks in the applications that utilize the storage resources of the virtual disks are identified.

In step 508, an application data map is generated that associates each of the applications, the corresponding aggregate data structures, and the corresponding virtual disk level backups.

In one or more embodiments of the invention, the data map is generated by obtaining UUIDs associated with the virtual disk level backups from backup storage. The data map may be generated by creating a list that includes entries. Each entry may include an application identifier and one or more of the UUIDs. The one or more UUIDs may be associated with the virtual disk level backups that include any quantity of the application data for the application identified by the application identifier.

The virtual disk level backups and the data map may be provided to the backup storage in response to the backup request for the entity. The aforementioned data structures may be used to perform restorations and selectively obtain backup data associated with applications.

The method may end following step 508.

To further clarify embodiments of the invention, a non-limiting example is provided in FIGS. 6.1-6.7. Each of these figures may illustrate a system similar to that illustrated in FIG. 1 at different points in times. For the sake of brevity, only a limited number of components of the system of FIG. 1 are illustrated in each of FIGS. 6.1-6.7.

Example

Consider a scenario as illustrated in FIG. 6.1 in which a production host (600) is providing computer implemented services to clients (not shown). To provide the computer incremented services, the production host (600) hosts a virtual machine (602). The virtual machine (602) hosts a database application (602.2) and email application (602.4). Each of these applications store corresponding application data in a first virtual disk (604) and a second virtual disk (606). Specifically, the database application (602.2) stores database application data (604.2) in the first virtual disk (604). Similarly, the email application (602.4) stores email application data (606.2) in the second virtual disk (606).

To provide data protection services, a backup storage (620) is tasked with storing backups from the production host (600). To do so, the backup storage (620) includes a deduplicated repository (622).

At a first point in time illustrated in FIG. 6.2, the production host (600) receives an instruction to generate backups for the virtual machine (602) from a remote agent (not shown). In response to the instruction, the production host (600) generates a virtual machine backup (610) for the virtual machine (602). The virtual machine backup (610) includes a first virtual disk backup for the first virtual disk (604) and a second virtual disk backup associated with the second virtual disk (606).

Additionally, the production host (600) generates an application data map (608). To generate application data map (608), the production host (600) contacts the backup storage (620) to obtain UUID 1 which the backup storage (620) will associate with the first virtual disk backup and UUID 2 which the backup storage (620) will associate with the second virtual disk backup. Using the obtained identifiers, the production host (600) adds associations to the application data map specify that the database application (602.2) is associated with UUID 1 and the email application (602.4) is associated with UUID 2.

After generating the application data map (608) and the virtual machine backup (610), the production host (600) sends the aforementioned data structures to the backup storage (620). Using the aforementioned data structures, the backup storage (620) generates containerized backups (622.2) by deduplicating and storing the virtual machine backup (610, FIG. 6.2) in the deduplicated repository (622) in a containerized format as illustrated in FIG. 6.3. Additionally, the backup storage (620) generates a global application data map (624) using the application data map (608, FIG. 2). In the state illustrated in FIG. 6.3, the system is able to perform application level backups using both the containerized backups and (622.2) and the global application data map.

The second point in time as illustrated in FIG. 6.4, the production host (600) fails. Consequently, the clients that were obtaining services from the production host (600) are unable to obtain the desired services. However, the database services provided by the production host (600) were highly valuable. Accordingly, the clients requested that access to the database services be restored.

To restore access to the database services, a remote agent (not shown) initiates a restoration process for the database application. To do so, the remote agent (not shown) sends commands to a second production host (630) as shown in FIG. 6.5 to perform a restoration of the database application. As seen in FIG. 6.5, the second production host (630) already had a second virtual machine (632) that hosted a copy of the database application (632.2). However, the copy of the database application (632.2) did not have application data that would allow it to provide database services.

To place the copy of the database application (632.2) into a state in which it can provide the desired database services, the second production host (630) performs an application level restoration of the copy of the database application (632.2). To perform the application level restoration, the second production host (630) sends a request to the backup storage (620) for data that could be used to perform the application level restoration.

In response to the request, the backup storage (620) uses the global application data map to identify that such data is included in the first virtual Drive backup included in the containerized backups (622.2). The backup storage (620) makes this identification by searching the global application data map (624) for all UUIDs associated with the database application. The backup storage (620) identifies that UUID 1 is associated with the database application. The backup storage (620) further identifies that the global application data map (624) includes first access information associated with UUID 1. Using the first access information, the backup storage (620) obtains the first virtual disk backup from the containerized backups (622.2) and locally mounts the first virtual disk backup and provides remote access to the first virtual disk.

Using the remote access, the second production host (630) obtains a copy of the first virtual disk backup (636) as illustrated in FIG. 6.6. Using the first virtual disk backup (636), a second production host (630) restores the application data for the copy of the database application (632.2) and stores the restored database application (634.2) in a third virtual disk (634) as shown in FIG. 6.7.

After obtaining the restored database application data (634.2), the copy of the database application (632.2) is able to provide database services in the same manner that the database application (602.2, FIG. 1) hosted by the now-unavailable production host (600, FIG. 6.1) did previously.

End of Example

As seen from FIGS. 6.1-6.7, embodiments of the invention may provide a computationally efficient method of obtaining a limited amount of data from a deduplicated repository that may be used to selectively restore an application to a previous state. By doing so, the computational cost for restoring the application may be reduced when compared to methods for restoration that may use larger amounts of data.

Figure 7:
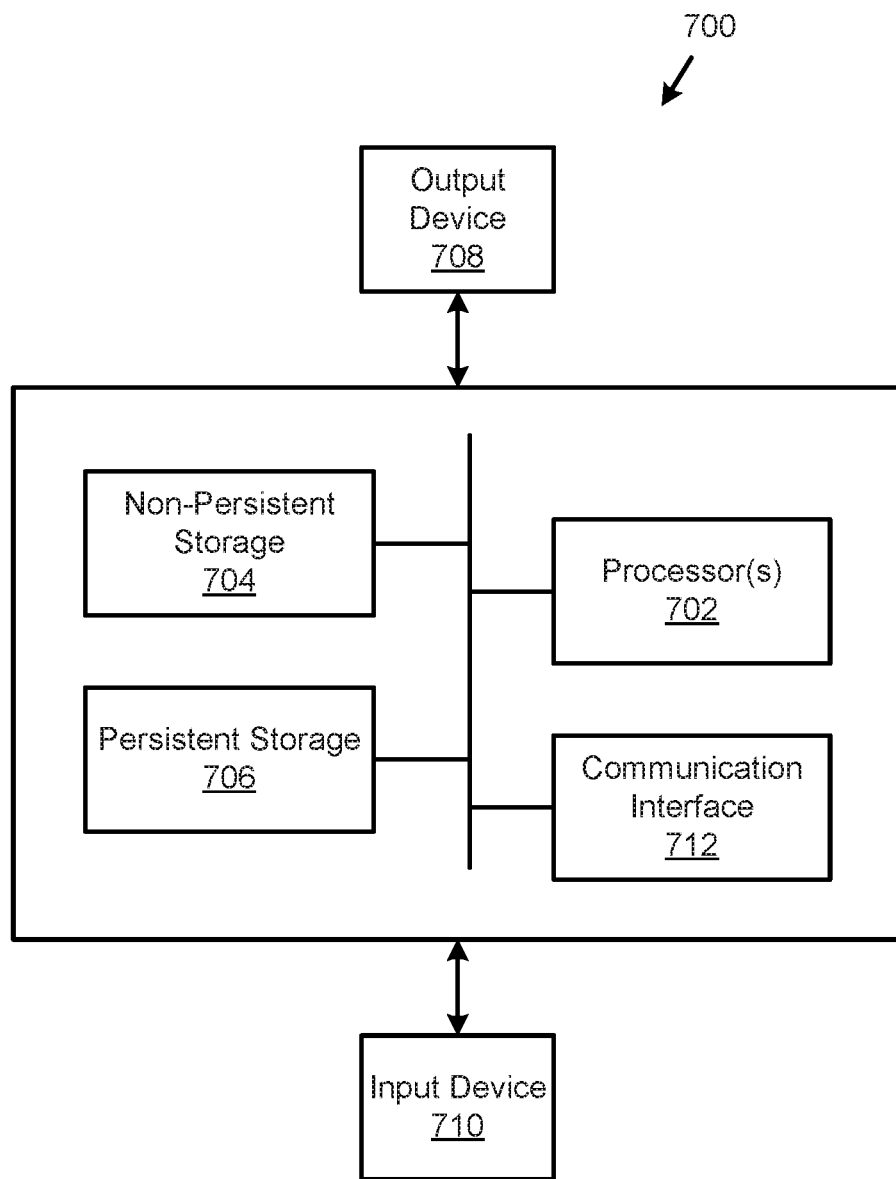
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system that provides data protection services across a distributed architecture. By providing data protection services, the failure of any component of the system may be remediated without causing the system as a whole to fail. Further, embodiments of the invention may provide a computationally efficient method for performing restorations of entities of the distributed system. Specifically, embodiments of the invention to reduce the total quantity of data used to perform a restoration by selectively obtaining portions of backup data.

Additional embodiments of the invention may provide a method for storing backup data in a small storage footprint format while still enabling some degree of selectivity for obtaining a portion of the backup data while stored in the small storage footprint format. By doing so, the computational cost of performing selective restorations may be reduced while still obtaining the benefit of storing backup data in a small storage footprint format.

Thus, embodiments of the invention may address the problem of the limited availability of computational resources. Specifically, embodiments of the invention may improve the efficiency of providing backup services for entities in a distributed system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A backup storage, comprising:
  a persistent storage for storing:
    backups of entities, and
    a global application data map; and
  a backup manager programmed to:
    obtain a restoration request for restoration of an application hosted by an entity of the entities;
    make a determination to accelerate the restoration based, at least in part, on the application;
    in response to the determination:
      identify a virtual disk level backup of the entity that is associated with the application using the global application data. map;
      obtain the virtual disk level backup from the backups of the entities;
      mount the virtual disk level backup in a backup storage;
      provide a virtual machine that is hosted by a production host and that hosts a copy of the application remote access to the mounted virtual disk level backup;
      using the remote access, instantiate a new virtual disk that only includes data from the virtual disk level backup and associated with the application in the production host; and
      restore the application using the new virtual disk.

2. The backup storage of claim 1, wherein identifying the virtual disk level backup of the entity that is associated with the application using the global application data map comprises:
  searching the global application data map using an identity of the application as a key to obtain a unique identifier associated with the virtual disk level backup.

3. The backup storage of claim 2, wherein obtaining the virtual disk level backup from the backups of the entities comprises:
  identifying, using the unique identifier associated with the virtual disk level backup,
    a plurality of segments that are:
      stored in the persistent storage, and
      associated with the virtual disk level backup; and
  combining the plurality of segments to obtain the virtual disk level backup.

4. The backup storage of claim 3, wherein the plurality of segments is stored in a containerized format.

5. The backup storage of claim 1, wherein a backup of the backups of the comprises:
  the virtual disk level backup; and
  a second virtual disk level backup,
  wherein the virtual disk level backup is associated with a first virtualized disk of an entity of the entities,
  wherein the second virtual disk level backup is associated with a second virtualized disk of the entity.

6. The backup storage of claim 5, wherein the global application data map specifies that:
  the application is associated with the virtual disk level backup; and
  the application is not associated with the second virtual disk level backup.

7. The backup storage of claim 1, wherein the data from the virtual disk level backup and associated with the application is a portion of all data of the virtual disk level backup.

8. A method for restoring an application to a previous state using backups of entities and a global application data map, comprising:
  obtaining a restoration request for restoration of the application hosted by an entity of the entities;
  making a. determination to accelerate the restoration based, at least m part, on the application;
  to response to the determination:
    identifying a virtual disk level backup of the entity that is associated with the application using the global application data map;
    obtaining the virtual disk level backup from the backups of the entities;
    mounting the virtual disk level backup in a backup storage;
    providing a virtual machine that is hosted by a production host and that hosts a copy of the application remote access to the mounted virtual disk level backup;
    using the remote access, instantiating a new virtual disk that only includes data from the virtual disk level backup and associated with the application in the production host; and
    restoring the application using the new virtual disk.

9. The method of claim 8, wherein identifying the virtual disk level backup of the entity that is associated with the application using the global application data map comprises:
  searching the global application data map using an identity of the application as a key to obtain a unique identifier associated with the virtual disk level backup.

10. The method of claim 9, wherein obtaining the virtual disk level backup from the backups of the entities comprises:
  identifying, using the unique identifier associated with the virtual disk level backup, a plurality of segments that are:
    stored in persistent storage, and
    associated with the virtual disk level backup; and
  combining the plurality of segments to obtain the virtual disk level backup.

11. The method of claim 10, wherein the plurality of segments is stored in a containerized format.

12. The method of claim 8, wherein a backup of the backups of the entities comprises:
  the virtual disk level backup; and a second virtual disk level backup,
wherein the, virtual disk level backup is associated with a first virtualized disk of an entity of the entities,
wherein the second virtual disk level backup is associated with a second virtualized disk of the entity.

13. The method of claim 12, wherein the global application data map specifies that:
the application is associated with the virtual disk level backup; and
the application is not associated with the second virtual disk level backup.

14. The method of claim 8, wherein the data from the virtual disk level backup and associated with the application is a portion of all data of the virtual disk level backup.

15. A non-transitory computer readable medium comprising computer readable program code, which when executed by a computer processor enables the computer processor to perform a method for restoring an application to a previous state using backups of entities and a global application data map, the method comprising:
obtaining a restoration request for restoration of the application hosted by an entity of the entities;
making a determination to accelerate the restoration based, at least in part, on the application;
in response to the determination:
identifying a virtual disk level backup of the entity that is associated with the application using the global application data map;
obtaining the virtual disk level backup from the backups of the entities;
mounting the virtual disk level backup in a backup storage;
providing a virtual machine that is hosted by a production host and that hosts a copy of the application remote access to the mounted virtual disk level backup;
using the remote access, instantiating a new virtual disk that only includes data from the virtual disk level backup and associated with the application in the production host; and
restoring the application using the new virtual disk.

16. The non-transitory computer readable medium of claim 15, wherein identifying the virtual disk level backup of the entity that is associated with the application using the global application data. map comprises:
searching the global application data map using an identity of the application as a key to obtain a unique identifier associated with the virtual disk level backup.

17. The non-transitory computer readable medium of claim 16, wherein obtaining the virtual disk level backup from the backups of the entities comprises:
identifying, using the unique identifier associated with the virtual disk level backup, a plurality of segments that are:
stored in persistent storage, and
associated with the virtual disk level backup; and
combining the plurality of segments to obtain the virtual disk level backup.

18. The non-transitory computer readable medium of claim 1, wherein the plurality of segments is stored in a containerized format.

19. The non-transitory computer readable medium of claim 15, wherein a backup of the backups of the entities comprises:
the virtual disk level backup; and
a second virtual disk level backup,
wherein the virtual disk level backup is associated with a first virtualized disk of an entity of the entities,
wherein the second virtual disk level backup is associated with a second virtualized disk of the entity.

20. The non-transitory computer readable medium of claim 15, wherein the data from the virtual disk level backup and associated with the application is a portion of all data of the virtual disk level backup.

* * * * *

UNITED STATES PATENT AND TRADEMARK OFFICE
CERTIFICATE OF CORRECTION

PATENT NO.      : 11,119,685 B2
APPLICATION NO. : 16/392562
DATED           : September 14, 2021
INVENTOR(S)     : Nitin Anand et al.

Page 1 of 1

It is certified that error appears in the above-identified patent and that said Letters Patent is hereby corrected as shown below:

In the Claims

Column 22, Line 28 in Claim 8, the phrase "making a. determination" should read -- making a determination --.

Column 23, Line 2 in Claim 12, the phrase "where the, virtual disk" should read -- where the virtual disk --.

Column 24, Line 9 in Claim 16, the phrase "application data. map" should read -- application data map --.

Column 24, Lines 22-23 in Claim 18, the phrase "medium of claim 1" should read -- medium of claim 17 --.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*